United States Patent [19]

Budin et al.

[11] Patent Number: 5,276,703
[45] Date of Patent: Jan. 4, 1994

[54] WIRELESS LOCAL AREA NETWORK COMMUNICATIONS SYSTEM

[75] Inventors: Dan Budin, Newton; Alexander Herman, Sharon, both of Mass.; Colin Lanzl, Nashua, N.H.

[73] Assignee: Windata, Inc., Northboro, Mass.

[21] Appl. No.: 819,825

[22] Filed: Jan. 13, 1992

[51] Int. Cl.⁵ .......................................... H04L 27/30
[52] U.S. Cl. ................................. 375/1; 370/85.2; 370/93
[58] Field of Search ...................... 375/1, 106, 107; 380/34; 370/85.2, 85.3, 93, 94.1, 94.2, 100.1, 110.1

[56] References Cited

U.S. PATENT DOCUMENTS

| | | | |
|---|---|---|---|
| 3,921,137 | 11/1975 | McClearn, Jr. et al. | 370/85.7 |
| 3,980,945 | 9/1976 | Bickford | 375/1 |
| 4,030,033 | 6/1977 | Bibl et al. | 375/1 |
| 4,112,372 | 9/1978 | Holmes et al. | 375/1 |
| 4,161,786 | 7/1979 | Hopkins et al. | 364/900 |
| 4,210,780 | 7/1980 | Hopkins et al. | 370/80 |
| 4,361,890 | 11/1982 | Green, Jr. et al. | 375/1 |
| 4,587,662 | 5/1986 | Langewellpott | 375/1 |
| 4,601,043 | 7/1986 | Hardt et al. | 375/1 |
| 4,644,560 | 2/1987 | Torre et al. | 375/1 |
| 4,672,658 | 6/1987 | Kavehrad et al. | 375/1 |
| 4,691,326 | 9/1987 | Tsuchiya | 375/1 |
| 4,694,467 | 9/1987 | Mui | 375/1 |
| 4,703,474 | 10/1987 | Foschini et al. | 370/18 |
| 4,710,944 | 12/1987 | Nossen | 375/40 |
| 4,724,435 | 2/1988 | Moses et al. | 340/870.13 |
| 4,759,034 | 7/1988 | Nagazumi | 375/1 |
| 4,760,586 | 7/1988 | Takeda | 375/1 |
| 4,811,357 | 3/1989 | Betts et al. | 375/1 |
| 4,866,735 | 9/1989 | Mori et al. | 375/1 |
| 4,866,771 | 9/1989 | Bain | 380/23 |
| 4,873,699 | 10/1989 | Saussier et al. | 375/1 |
| 4,894,841 | 1/1990 | Martinino et al. | 375/1 |
| 4,901,307 | 2/1990 | Gilhousen et al. | 370/18 |
| 4,928,274 | 5/1990 | Gilhousen et al. | 370/92 |
| 4,930,139 | 5/1990 | Chandler et al. | 375/1 |
| 5,029,183 | 7/1991 | Tymes | 375/1 |
| 5,056,109 | 10/1991 | Gilhousen et al. | 375/1 |
| 5,084,900 | 1/1992 | Taylor | 375/1 |

OTHER PUBLICATIONS

Burns ("Traders Future in their Hands," *Chicago Sun-Times*, Feb. 3 1991).
Crawford, Jr. ("Electronic Trading Card Heads for Pits," *Chicago Tribune*, Feb. 3, 1991).
Wexler ("Wireless networks pass early tests," *Computerworld*, Feb. 25, 1991, p. 49).
("LAN's—Unwired for Success," *Global Networking Strategies*, Apr. 30, 1991).
Davis ("Wireless LAN's Broadcast Their Benefits over Cable," *Electronic Business*, May 6, 1991, pp. 58, 60, 62).
Hancock ("Wireless is Up and Coming," *Digital Review*, May 20, 1991, p. 17).
Greenstein ("Pulling the Plug on LANs," *Networking Management*, Jun. 1991, pp. 21-28).
Rosenbaum ("The Technology Behind Wireless LANs," *LAN Times*, vol. 8, Issue 13, Jul. 8, 1991).
Cerf ("Networks," *Scientific American*, Sep. 1991, pp. 72-81).

*Primary Examiner*—Salvatore Cangialosi
*Attorney, Agent, or Firm*—Lahive & Cockfield

[57] ABSTRACT

A local area network including at least one hub unit, at least one associated station unit and a wireless communication link between each hub unit and its associated station units. The communication link includes a wireless down-link channel for transferring information from each hub unit to its associated station units and a wireless up-link channel for transferring information from each station unit to its associated hub unit. Communication is conducted in accordance with a combination time division multiplexing and contention based protocol. A synchronized common slotted time frame between each hub unit and its associated station units is imposed by the hub unit.

49 Claims, 6 Drawing Sheets

WIRELESS LOCAL AREA NETWORK COMMUNICATIONS SYSTEM

BACKGROUND OF THE INVENTION

This invention relates to multiple access communication systems. More particularly, it relates to multiple access wireless local area network (LAN) communication systems.

The need for wireless interconnection of computers operating over LANs has become increasingly apparent as the popularity of LAN usage in office environments has grown. Traditionally, computers and computer related devices operating as part of a LAN have been interconnected using such conventional technologies as twisted pair, coaxial cable and optical fiber cable. A primary goal of conventional systems has been to utilize these technologies to realize fast, reliable, multiple access communications over the LAN. Historically, several communication protocols and topological architectures have been combined with traditional interconnection technologies to realize this goal.

In attempting to achieve the goal of fast communication, the issue of how to make efficient usage of the chosen transmission medium was repetitively addressed by prior art systems. A common trade off encountered with respect to bus allocation is how to allocate bus usage between high duty cycle subscribers and low duty cycle subscribers whose transmissions are characterized by a high peak-to-average transmission rate. Such low duty cycle subscribers are commonly referred to as "bursty" subscribers. Three general approaches were developed; time division multiplexing, frequency division multiplexing and space division multiplexing.

Time Division Multiplexing (TDM) attempts to take advantage of transmission mediums which can support a faster communication data rates then are required by any one user on the network. Essentially, multiple digital communication signals are interleaved in time over a single transmission path. Many different types of TDM based systems have become well known in the art. Examples include polling, priority request, communication path contention, and cyclic time division systems.

In a polling system, a central controller polls remote stations, offering each an opportunity to utilize the communication path. In a priority request system, remote stations request usage of the communication path and a central controller awards control of the path according to priority levels assigned to each station. Contention systems generally involve remote stations transmitting at random times and then retransmitting in the event of a detected collision. In a cyclic time division implementation, devices on the network are only permitted to transmit during a preassigned periodically occurring time slot. Some cyclic time division systems have fixed slot lengths and a fixed period while others allow for these parameters to be dynamically updated. Still others control the length of the time slots by passing a digital code, called a token, between devices operating on the network. Only when a device possesses the token, may it transmit.

Frequency Division Multiplexing (FDM), attempts to exploit transmission mediums which can support a wider bandwidth than is necessary to accommodate the highest frequency baseband device coupled to the network. In an FDM system, each transmission signal is modulated onto a different carrier signal operating about a particular center frequency. Each unique carrier signal is referred to as a channel. One example of frequency division multiplexing is frequency shift keying (FSK). FSK systems may be designed to operate in either a full or half duplex environment. A full duplex implementation assigns separate channels for transmission and reception, thereby enabling transmission and reception to occur simultaneously. Alternatively, half duplex systems require a single channel to be time multiplexed for both transmission and reception. FSK systems generally represent a logical one by a frequency shift in a particular direction relative to the center frequency. Similarly, a logical zero may be represented by an equivalent frequency shift in the opposite direction.

Space Division Multiplexing (SDM) simply adds more signal paths which are spacially isolated from each other, thereby increasing the number of signals that can be simultaneously transmitted. As implemented in a local area network, this involves providing a separated interconnection between any two devices wishing to communicate.

Another common issue raised in attempting to efficiently utilize a transmission medium is whether to implement a baseband or a broadband system. In the context of LANs, broadband refers to any system which transmits the digital information as an analog signal. One example is the FSK approach discussed above. Another example is phase shift keying (PSK). As the name suggests, PSK entails representing a logical one by a signal having a particular frequency and a particular phase while representing a logical zero by a signal having identical frequency but being phase shifted by a predefined amount.

The transmission path multiplexing approaches discussed above have traditionally been applied to various permutations of four topological architectures. These topologies are commonly referred to as; bus networks, loop networks, ring networks and star networks.

A bus network is one of the simplest configurations. In this type of a system the network is typically comprised of a passive transmission bus. The bus may consist of a single cable or many branches. Devices operating on such a network, commonly referred to as subscriber devices, interface directly to the bus and every device has access to transmissions from every other device. Since the bus is passive, it is the responsibility of the devices operating over the network to manage bus access. Traditionally, both frequency and time division multiplexing have been employed on such systems.

A loop network typically consists of an inbound unidirectional signal path, an outbound unidirectional signal path and a unidirectional path coupler for transferring signals from the inbound path to the outbound path at the system head-end. A loop network may also be a passive system. However, in some prior art implementations, a digital bus repeater (DBR) is employed as a path coupler. A DBR provides certain minimal formating functions and regenerates signals tending to deteriorate over long signal paths. Devices operating on a loop network typically interface to the network via an appropriate bus interface unit (BIU). As in the case of bus networks, both frequency and time division multiplexing have been utilized for efficient transmission path allocation.

A ring architecture, in its most rudimentary form, is a unidirectional closed loop signal path. Typically, devices may interface to the ring either directly or through an appropriate BIU. In some prior art implementations DBRs are inserted into the signal path periodically around the ring, and each subscriber device interfaces to the ring via a DBR. In other prior art implementation, two concentric unidirectional rings are employed. In an analogous fashion to the loop network, one ring services incoming communications signals while the other services the outgoing. Since the ring is a predominantly passive network, the devices operating over the network are responsible for efficient network allocation.

A star network typically involves having each subscriber device connected, via a dedicated communications path, to a central communication controller. Traditionally, if one device on the network wishes to send a message to another device on the network, it transmits the message to the central controller and the central controller, in turn, redirects the transmission to the appropriate destination device. In other prior art implementations of star networks the central controller acts as a switching unit. As such, instead of relaying communications, upon request from a transmitting device, it Performs switching operations to physically connect a transmitting device to a specified receiving device. As can be seen, the central controller relieves the subscriber devices of responsibility for efficient network allocation.

Many common prior art implementations have been developed which employ contention type time multiplexing protocols in an attempt to realize the most advantageous usage of the above discussed topologies. One early implementation, capable of utilizing either a bus, loop or ring topology can be characterized as a free-for-all system. According to this early implementation, subscriber devices transmitted at random and then waited a period of time for an acknowledgment from the destination device. If no acknowledgment was received then the sending device retransmitted. A substantial deficiency of this system was the number of communication collisions caused by contending subscriber devices.

Subsequent prior art implementations improved on this approach by adding a carrier sensing feature. Generally referred to as carrier sense multiple access (CSMA) or listen before talk (LBT), this protocol required transmitting devices to determine whether the shared communication path was available prior to beginning a transmission. However, this protocol, nevertheless, suffered inefficiencies because collisions of simultaneously transmitted signals went undetected until the transmitting device failed to receive the expected acknowledgment from the receiving device.

The CSMA approach was later improved upon by the addition of collision detection (CSMA/CD), also known as a listen while talk protocol (LWT). According to a LWT protocol, the transmitting device monitors the bus during transmission so that a collision is detected at the earliest possible time. Considerable time savings occur by early detection if transmission distances are such that there is a long round trip delay between the transmitter and the receiver. Additional time savings occur when lengthy communications are involved and a collision occurs early on in the transmission.

Several non-contention based prior art systems have been developed which relieve subscriber devices operating on the network from having to detect collisions. One such implementation which tends to eliminate communication collisions is a cyclic TDM approach, commonly referred to as a token passing ring. As the name suggests, this network exploits a ring type architecture. In a token passing ring system, the devices on the network continuously pass, between themselves, a digital code, called a token. Only when a device possesses the token, may it transmit data over the ring. In this way network communications are interleaved in time. FDM may also be utilized to modulate the baseband signals being time multiplexed over the communication path.

Two other implementations of cyclic TDM systems are well known in the art. They are fixed slot allocation and dynamic slot allocation. In a fixed slot allocation system, regularly occurring time slots in a repetitive framed sequence are dedicated to specific devices operating on the network, for their transmissions. In dynamically allocated systems, Parameters such as the size of each time slot and the number of time slots allocated to a particular device may be varied. Since a device only transmits during its allocated time slots, communication collisions generally do not occur.

Although the above discussed prior art implementations have succeeded in realizing fast, reliable, secure communications in a multiple access LAN environment, they nevertheless suffer from substantial deficiencies. High on the list of drawbacks to a hardwired system is the considerable cost of installation resulting from having to run cables throughout an office. Another deficiency is the difficulty associated with relocating subscriber devices within an office. A further drawback of hardwired systems is the cost and difficulty associated with moving an entire system from one location to another. Therefore, the most recent activity in the field of LANs has centered around the development of wireless LANs.

There are two primary technologies being developed to provide wireless LAN connections. One is infrared light and the other is radio. Most systems that propose the use of light to transmit data over a local area networks focus on wavelengths in the infrared part of the visible spectrum. This choice is natural because the physical devices for transmitting are plentiful and inexpensive. Additionally, infrared technology is also suited to very high data rates.

However, infrared communication systems are mostly limited to line-of-sight links because light cannot penetrate doors and walls. Systems which use diffused sources and which rely on reflections off walls and ceilings have been built, but none have succeeded in multiple-room environments without the use of extensive repeater networks. Additionally, infrared tranceivers are easily interrupted by people walking around an office.

Radio waves have long been used for voice communication. Hand-held walkie-talkies are essential for plant-maintenance personnel in large office buildings. FAX and telephone communications over cellular radio links are becoming integral to many modern businesses. The use of radio technology for high speed data communication over such links is now emerging.

The primary advantage that radio has over infrared is its ability to penetrate most solid objects found within a building. Consequently, objects such as wall boards, wood doors, modular office walls, and people will not disrupt a radio signal to the same degree as an infrared signal. However, prior art systems have yet to completely overcome several difficulties inherent to designing a radio based LANs for operation in an office environment.

One significant difficulty is effectively dealing with multiple signal paths created by transmission signal reflection. Other issues involve guarding against unauthorized reception of communication signals and interference with those signals.

The FCC has recognized the need to use radio transmissions for commercial in-building communication systems and has allocated three separate bands for low powered systems that do not require user licensing. Specifically, these frequency bands are 902-928 MHz, 2.4-2.5 GHz, and 5.8-5.9 GHz. The 902-928 MHz band is both fairly narrow and crowded with such devices as store security systems and paging systems. However, the other two bands offer sufficient bandwidth to transmit data at LAN megabit data rates and they are virtually free of interference from other devices.

Another frequency band that is being used for wireless networks is 18-19 GHz. This frequency range does offer a great deal of bandwidth, ten 10 MHz channels. However, the use of this band requires an FCC license on a per location basis. This restricts the freedom a user has in installing a wireless LAN as well as the ability to move the system. Connection costs are significantly higher because the cost of radio components increases along with the frequency.

Another drawback to utilizing this band is that it is very close to infrared and as a result, shares many of the propagation characteristics of light. Since signal penetration of solid objects, such as walls is low, the effective range is small, typically a 40 foot radius. This increases the need to provide many repeaters to cover a typical office environment and further increases the overall system cost.

Accordingly, it is an object of the present invention to provide a wireless, radio frequency, multiple access communication system for use within an office environment.

It is a further object to provide a wireless, radio frequency, multiple access communication system which is effectively immune to information transmission problems caused by signal reflections.

It is another object of the invention to provide a wireless radio frequency, multiple access communication system which accommodates both high and low duty cycle subscribers.

An additional object of the invention is to provide a wireless radio frequency, multiple access communication system which implements a carrier sense multiple access with collision detection protocol.

Another object of the invention is to provide a wireless system which avoids any need for FCC licensing, thereby providing the user with additional flexibility with respect to system installations and subsequent system relocation.

SUMMARY OF THE INVENTION

The invention is directed to multiple access communication systems. In particular, it relates to a local area network including at least one hub unit, one or more associated station units, and a wireless communication link between each hub unit and its associated station units. The wireless communication link includes a wireless radio frequency signal path for transferring information from each hub unit to all of its associated station units at a first frequency, $f_1$. The communication link also includes a wireless radio frequency signal path for transmitting information from each station unit to its associated hub unit at a second frequency, $f_2$.

According to the invention, $f_1$ and $f_2$ are frequencies at which reflections from local objects may occur, causing a plurality of the first and second frequency paths to exist between a particular hub unit and an associated station unit. The invention includes recovery elements for recovering the transmitted information signal, by combining signals passing over the plurality of paths.

The invention also includes synchronization elements for establishing a common slotted time frame for each hub unit and its associated station units and for allocating subsets of the slots of the time frame to each of the associated station units. A combination slotted and contention-based communication protocol is utilized.

BRIEF DESCRIPTION OF THE DRAWINGS

The foregoing and other objects of this invention, the various features thereof, as well as the invention itself, may be more fully understood from the following descriptions, when read together with the accompanying drawings in which.

DESCRIPTION OF THE PREFERRED EMBODIMENT

Basic System Architecture

Figure 1:
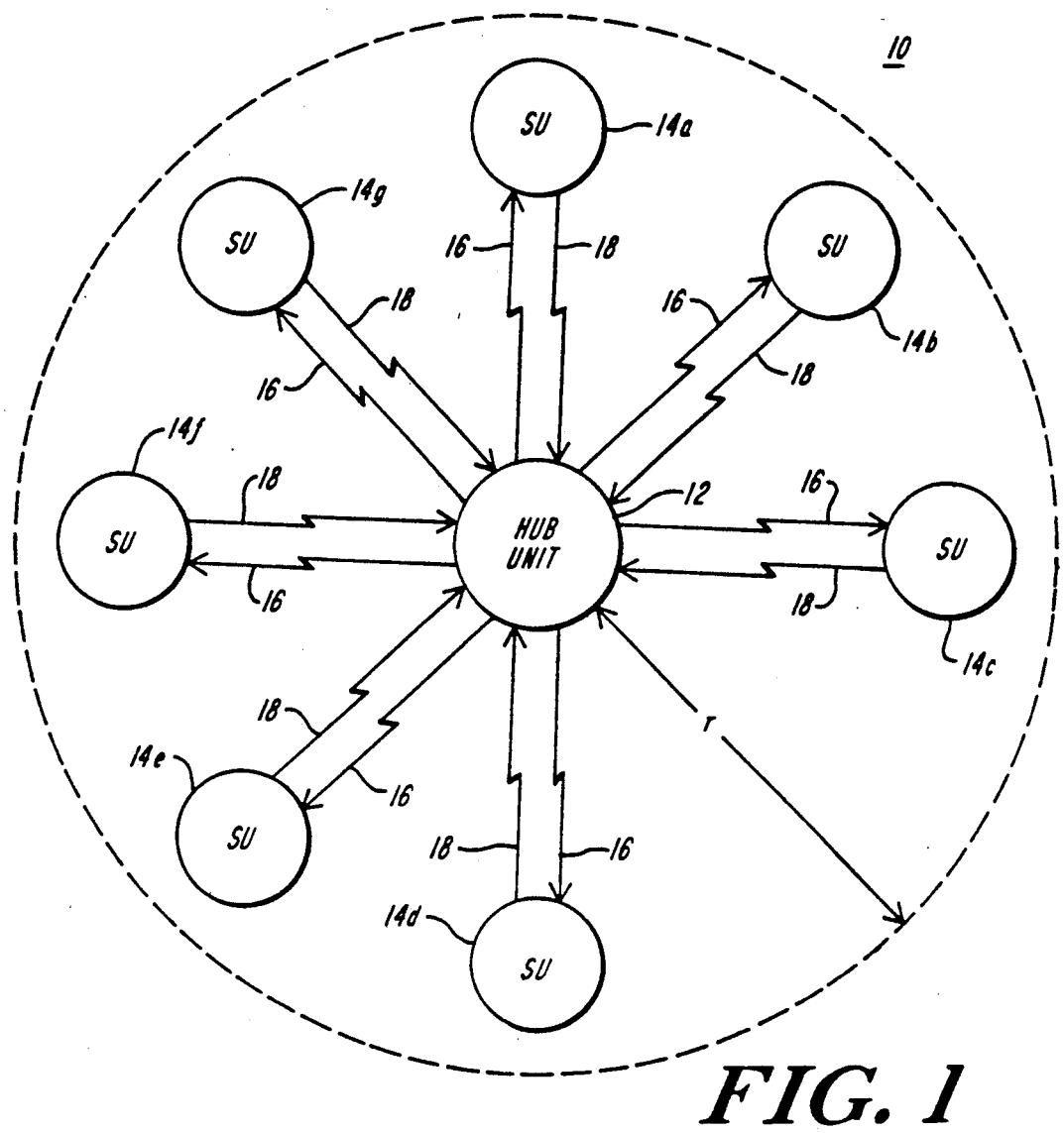
FIG. 1 shows a block diagram of a wireless communication system in accordance with the invention.

FIG. 1 shows a wireless multiple access communication network 10 according to the invention. The system of FIG. 1 includes a Hub Unit (HU) 12 in radio communication with a plurality of Subscriber Units (SUs) 14a-14g. All transmissions from the HU 12 to the SUs 14a-14g are over a channel 16. That channel operates at a frequency of 5.78 GHz in the depicted embodiment. All transmissions from the SUs 14a-14g to the HU 12, are over an up-link channel 18. The SU to HU transmission frequency is 2.44 GHz. Both channels, 16 and 18 thus operate at frequencies at which significant reflections occur from local objects.

Figure 2:
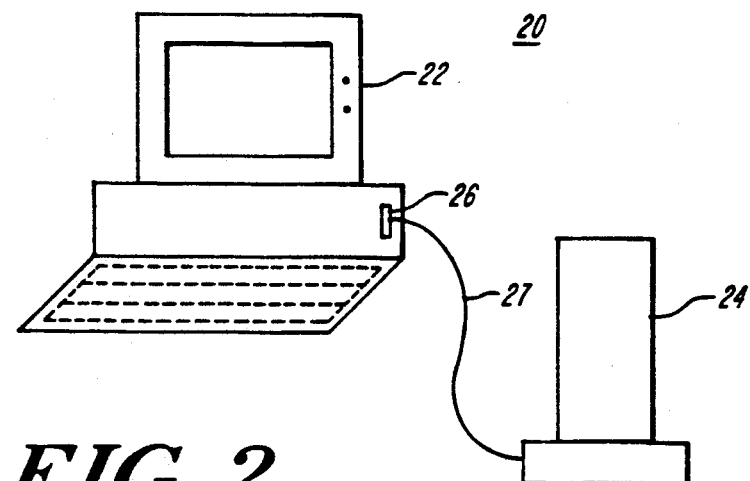
FIG. 2 shows a detailed block diagram of a station unit in accordance with the system of FIG. 1.

As is shown in FIG. 2, according to one embodiment of the invention a typical SU 20 is comprised of a data terminal 22, a wireless transceiver 24 and a network interface 26. The data terminal 22 may be a programmed digital computer or computer-related device. The wireless transceiver 24 is coupled to the data terminal 22 by way of the cable 27 and the network interface 26. The network interface 26 is typically mounted internal to the data terminal 22 and converts information from the format being utilized over the wireless network to the particular format used by the data terminal 22. In the wireless system of FIG. 1, the wireless tranceivers included in SUs 14a-14g transfer information, over the wireless network 10, between the SUs 14a-14g and the HU 22. Similarly, the HU 22 also includes a wireless transceiver operating in a comparable fashion.

Referring to FIG. 1, HU 12 controls all communication occurring over the wireless network 10. It receives transmissions on the channel 18 from the wireless tranceivers associated with particular SUs and rebroadcasts those communications over the channel 16 to all SUs 14a-14g on the network 10. The HU 12 has associated with it an Effective Service Area which defines an area of coverage 19 which may be generally characterized by a maximum HU to SU radial distance, r. In a preferred embodiment, the Effective Service Area has an r of at least eighty meters and each HU supports at least sixty-two wireless units. In systems with more than on HU, with each HU having an associated set of SUs, the Effective Service Areas of multiple HUs may overlap. However, some denegration in performance may occur along the overlapping areas.

The HU 12 also acts as the agent for all network management functions. One example of such a function is collecting appropriate performance and error statistics. Another management function involves executing all control commands, such as enabling and disabling specific wireless transceivers. Although FIG. 2 depicts a SU as being comprised of a single data terminal having a dedicated wireless transceiver, this may not be the case in other embodiments.

Figure 3:
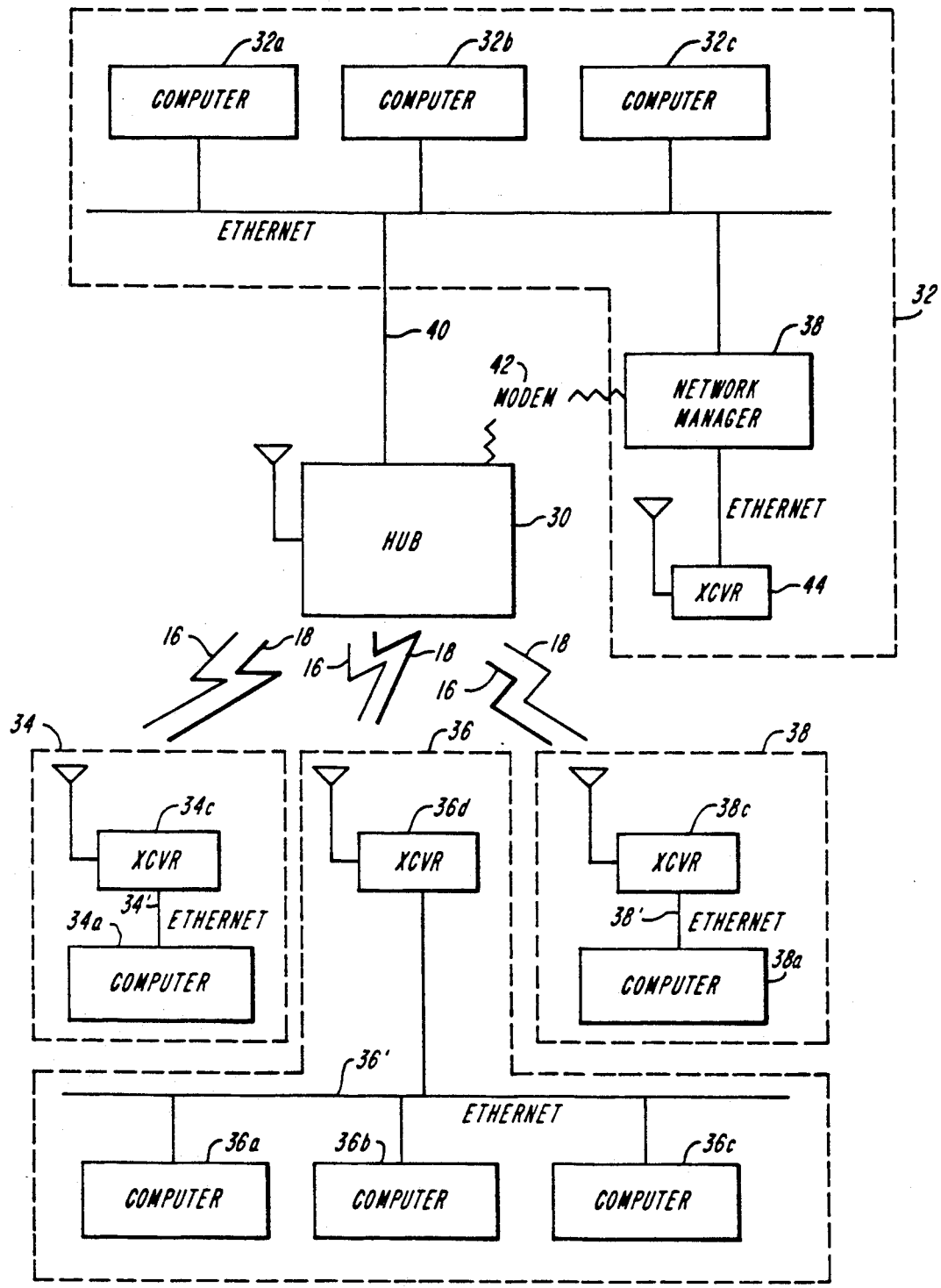
FIG. 3 shows a block diagram of the hub unit of FIG. 1 acting as a central controller for a plurality of networks, both wired and wireless.

FIG. 3 depicts an alternative embodiment of the invention wherein an HU 30 acts as the central controller for a plurality of networks 32, 34, 36 and 38, both hardwired and wireless. As shown in FIG. 3, each of those networks is an Ethernet local area network having two or more computers functioning as terminals at there respective Ethernet nodes. Each network 32, 34, 36 and 38 may also be considered to be an SU in the present invention. Network 32 includes a plurality of data terminals 32a-32c connected to an Ethernet bus 32' and an additional network controller 38. Network 32 is in communication with the HU 30 by way of a wired interconnection 40. The HU 30 is also in communication with the network manager 38 via modem 42 and a wireless transceiver 44. Network 34 includes data terminal 34a coupled to Ethernet bus 34' and communicates with the HU 30 via wireless transceiver 34c. Likewise, network 36 comprises data terminals 36a-36c coupled to bus 36' and communicates with the HU 30 through wireless transceiver 36d. Finally, network 38 includes data terminals 38a coupled to bus 38' in communication with the HU 30 via wireless transceiver 38c.

As in the case of the system of FIG. 1, the HU 30 receives transmissions over channel 18 from the various wireless tranceivers and retransmits them over channel 16 to all devices in its Effective Service Area. It also sends this same information over a wired connection 40 to bus 32'. Information transmitted to the HU 30 from the bus 32' is also broadcast to all wireless tranceivers. As can be seen from network 36, a single wireless transceiver may support a plurality of data terminals operating over a hardwired network.

In the illustrated embodiment, the hardwired network is an IEEE 802.3 (Ethernet) type system and the wireless transceiver appears to the wired network as an IEEE 802.3 Media Access Unit (MAU). Alternatively, when the wired network is an IEEE 802.5 (token ring) network, the wireless transceiver appears to the network as part of the ring wiring.

Communications Protocol Overview

The network communications protocol is described below in terms of the basic architecture depicted in FIG. 1. However, the same protocol is readily applied to the more complex system of FIG. 3.

Referring to FIG. 1, the HU 12 transfers information to its associated SUs 14a-14g via a down-link radio communication channel 16 having a frequency of 5.78 GHz. Likewise, the SUs 14a-14g transfer information to the HU 12 over an up-link radio communication channel 18 having a frequency of 2.44 GHz. Substantially all communications to the HU 12 are rebroadcast over the down-link 16 to all communicate with another SU, then the transmission is first directed, via the up-link 18, to the HU 12. The SU for whom the communication is intended will receive it during the HU's 12 rebroadcasting.

Communication between the HU 12 and its SUs 14a-14g is conducted utilizing a combination contention and time division multiple access (TDMA) based protocol. The specific type of time division multiplexing employed is a form of dynamic slot allocation. Therefore, the HU 12 identifies which SU 14a-14g is transmitting from either an explicit identifier in the transmission or from the particular time slot in which the transmission occurs. Likewise, a particular SU identifies HU transmissions intended for it by when the transmission occurs or by an identifier in the transmission.

A traditional slotted protocol typically involves the HU 12 establishing a common time frame between itself and all SUs 14a-14g operating over the network 10; dividing the common time frame into a plurality of cyclicly repeating time slots; and assigning one or more time slots to each SU 14a-14g. In a typical slotted system, each SU 14a-14g is restricted to only transmitting over the wireless network 10 during its assigned time slots. Additionally, if dynamic allocation is employed, the HU 12 is able to modify such parameters as the number of time slots assigned to a particular SU 14a-14g and the length of such time slots. Since no two SUs 14a-14g are ever transmitting at the same time, a plurality of SUs 14a-14g can share a common transmission frequency without concern for signal collisions.

Traditional slotted systems, even when dynamic allocation is employed, suffer from inefficiencies encountered from trying to accommodate both bursty and high duty cycle SUs. As previously discussed, some prior art systems have attempted to overcome these inefficiencies by utilizing slotted allocation over a portion of the defined time frame to accommodate the high duty cycle users and utilizing a contention based protocol over another portion of the time frame to accommodate the bursty type users. Although that approach is an improvement over traditional slotted systems, communication over the contention portion of the time frame can be slowed greatly due to multiple communication collisions between contending devices.

The system of FIG. 1 implements an alternative variation of a dynamically allocated time slotted system. Initially, the HU 12 imposes a common slotted time frame. During this period the SUs 14a-14g requiring use of the up-link channel 18, utilize assigned time slots to broadcast Transmit Request Codes to the HU 12. The HU 12 identifies which SU is requesting access to the up-link 18 by the particular time slot in which the request arrives. The HU 12 grants access to the up-link channel 18 by responding affirmatively to the requesting SU. Once granted access to the channel 18, the transmitting SU has sole control until it completes its transmission. Information is transmitted over the network as discrete packets. Therefore, access time can be regulated by limiting the number and size of data packets that an SU is allowed transmit pursuant to any single transmission request.

A considerable advantage of this system is that it more efficiently accomodates both high duty cycle and bursty type users. Since assigned time slots are primarily used for exchange of short control type messages such as Transmit Request Codes, they can be made very small as compared with time slots utilized in many prior art systems. Therefore, a time slot assigned to a particular SU occurs more frequently, therein increasing the likelihood of fast access to the transmission channel. Additionally, the packet size and quantity limitations ensure that high duty cycle users will not load down the network to such a degree that bursty type users are not adequately serviced. Furthermore, since the HU 12 may dynamically change the number of packets that a particular SU may transmit pursuant to a single transmission request, the network can accommodate occasional long transmissions. The HU 12 may also assign more than one time slot to a particular SU, causing certain high priority users to be serviced more often. Time slot assignment is also dynamically updatable, generally by the HU 12.

Imposing a slotted time frame during the period when SUs 14a–14g are requesting up-link channel 18 access substantially reduces communication collisions between competing SUs. However, collisions nevertheless, have the potential to occur during the time when one SU is transmitting and another SU wishes to request up-link channel access. Therefore, the requesting SU must not only synchronize itself to a preassigned time slot, but must also ensure that the HU 12 has not previously allocated sole control of the channel 18 to another SU. To ensure the channel 18 has not been previously allocated, the HU 12 imposes a listen before talk (LBT) protocol. Accordingly, prior to broadcasting a request, an SU 14a–14g monitors the HU down-link channel 16, to determine that no other SU is in the midst of transmitting. This further reduces the chance of communication collisions.

Regardless of the LBT collision avoidance approach, communication collisions sometimes occur as a result of the round trip communication delay between the HU 12 and the SUs 14a–14g. Therefore, the HU 12 also imposes a Listen While Talk (LWT) collision detection approach. This ensures the earliest possible detection of those collisions that do occur. Accordingly, each SU 14a–14g monitors the HU down-link channel 16 during transmission to ensure that its broadcasted message is correctly received by the HU 12. If the transmitting SU determines that its signal is not being correctly received by the HU 12 then it terminates its transmission, relinquishes control of the channel 18, and waits for its assigned time slot to occur so it can once again request control of the up-link channel 18.

Communication Protocol Detail Description

According to one embodiment of the invention, the time frame is divided into 64 time slots. Each time slot is further divided into symbols. Each time slot typically contains six symbols. The smallest sub-division of the time frame is a chip. A chip is essentially equivalent to a binary bit. Each symbol is typically comprised of 48 chips.

Typically, the network 10 of FIG. 1 transits through three states of operation. They are IDLE, BUSY and PACKET. As will be discussed in greater detail below, the network may transit from IDLE to BUSY, from BUSY to either IDLE or PACKET, and from PACKET to IDLE. Operation of the HU 12 and the SUs 14a–14g during each of these states is described below.

During the IDLE state the network is operating in a slotted environment, and the HU 12 is waiting for new packets to be received from its associated SUs 14a–14g. The SUs 14a–14g are permitted to broadcast requests to join the network and Transmit Request Codes, as long as the requests are synchronized to their assigned time slots. Requests to join the network are discussed in greater detail below with respect to system initialization. While in the IDLE state, the HU 12 transmits an Idle Code over the down-link channel 16 to all of the SUs 14a–14g at a particular data rate.

SUs that experience multiple communication errors or that are attempting to join the network 10 may be in a subcategory of the IDLE state called IDLE NO TX. In this state the SU is trying to synchronize itself with the network and acquire the network spread spectrum codes. This state is discussed in detail in the system initialization section below.

Figure 4:
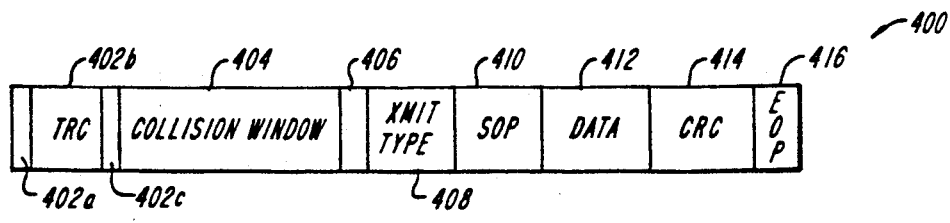
FIG. 4 illustrates a communication format utilized by the up-link channel of the invention.

FIG. 4 illustrates a communication format utilized by the up-link channel of the invention.

The HU notifies a requesting SU that it has been granted control of the up-link channel by transmitting a BUSY code over the down-link channel, timed in such a way that the SU being granted channel control receives the BUSY code exactly at its slot boundary. Consequently, to request control of the up-link channel, a SU must broadcast its Transmit Request Code (TRC) over the up-link channel 18, at precisely the correct time so that, taking into account all delays, the HU is able to cause the BUSY code response to arrive at the requesting SU's slot boundary. This requires each SU to have a first preassigned time slot when transmissions are appropriate and a second preassigned slot when receptions directed to particular SU's should be expected. As can be seen, the reception time slots are delayed in time from the transmission time slots by an amount substantially equal to the round trip delay between the HU and the requesting SU.

The TRC is typically five symbols long. The first symbol 402a provides the differential phase shift keying (DPSK) reference for the HU receiver. The following four symbols 402b comprise the actual TRC. After the code symbols 402b, there is a one symbol guard band 402c which ensures that the TRC 402b does not overlap into the next preassigned slot. The four symbol length of the TRC allows the HU to make an initial determination that this request is not a false alarm. Following the TRC 402, the requesting SU broadcasts a stream of fifteen ZERO symbols to the HU 12. The first fourteen of these symbols are known as a Collison Window 404 because collisions may occur with TRCs from other SUs. Collisions result from other SUs not knowing that a particular SU is requesting access to the network until the HU rebroadcasts the request. Thus, the length of the collision window 404 is determined by the round trip communication delay. If at any time during the collision window the requesting SU receives any transmission except a BUSY Code, it assumes another SU has control of the channel and terminates its transmission. The fifteenth symbol 406 is not subject to collision. The HU 12 causes the network 10 to transit into the BUSY state following detection of a TRC from any of its associated SUs 14a–14g.

If the TRC is approved by the HU 12, the HU 12 transmits a sequence of BUSY Codes for twenty-eight consecutive symbols over the down-link channel 16, causing all SUs 14a–14g to transit into the BUSY state and indicating that no further transmission requests will be entertained. The HU 12 causes the first BUSY code to occur at the slot boundary for the requesting SU. The requesting SU 14a interprets a BUSY code, so received, as confirmation that it has been granted control of the up-link channel 18. This occurs at approximately the end of the collision window 404.

Following transition into the BUSY state, the requesting SU 14a transmits a two symbol UPTYPE code 408 which specifies whether it is about to transmit a regular packet, a supervisory packet, a transmitter test packet (TTP), or a regular packet with buffer overflow warning. The SU 14a then transmits a ten symbol Start-Of-Packet (SOP) Code 410. The ten symbol SOP length results from the delay time required by Trellis encoding utilized by the system. However, this delay time is not wasted.

According to the invention, the HU uses the known SOP symbols to once again confirm that a false alarm has not occurred. Without this confirmation, the HU would have to wait for and End-Of-Packet (EOP) symbol to detect a false alarm. The HU 12 detects a false alarm by performing signal quality measurements. If the signal quality does not meet a predetermined threshold or if the HU 12 does not receive the SOP code within a predetermined time, the HU 12 declares a False Alarm, broadcasts a DOWNTYPE code informing the SUs of the False Alarm and transits back to the IDLE state. Any time the HU 12 causes the network 10 to transit back into the IDLE state, it broadcasts a Information Supervisory Packet (ISP) which includes information directing which of its associated SUs 14a–14g is up first in the slotting sequence. The HU 12 may assign any of the SUs 14a–14g to be up next in the sequence, regardless of which SU was previously being serviced. Early false alarm detection increases network throughput by terminating spurious communications quickly. Moreover, having the second false alarm detection allows the TRC to be fewer symbols than would be necessary if false alarms were required to be completely eliminated during the first test. Since the required length of the TRC directly impacts the length of the time slots, a short TRC allows for implementation of short time slots. Short time slots further increase network throughput because each SU can be served more quickly. The HU further utilizes the SOP symbols to perform signal quality measurements used to select which of the three HU modems (e.g., early, late, or on time) will be utilized to receive the data portion of the transmission.

If the signal quality level is sufficient, then the HU 12: (1) selects a modem having the best quality signal to receive the subsequently transmitted symbols; (2) transmits over the down-link channel 16 a DOWNTYPE Code announcing to the SUs 14a–14g which HU modem is to be used; (3) rebroadcasts the Start-Of-Packet Symbols over the down-link channel 16; (4) enables a trellis encoder to operate during rebroadcast of the symbols subsequently received from the transmitting SU 14a; and (5) causes the network to transit into state.

During the PACKET state, the data packet 412 is broadcast from the transmitting SU 14a over the up-link channel 18 to the HU 12. The data packet 412 is transmitted in a trellis encoded format. There is a three symbol processing delay between reception at the HU 12 over the up-link channel 18 and rebroadcast by the HU 12 over the down-link channel 16. The transmitting SU 14a includes a thirty-two symbol check sum (CRC) 414 and a nine symbol End-Of-Packet Code at the end of a transmission. The CRC 414 and the End-Of-Packet Code 416 are echoed over the down-link 16, followed by a 10 symbol Tail which enables Trellis Decoders at the SUs 14a–14g to complete the decoding of the data transmitted by the HU 12 over the down-link 16.

Following rebroadcast of the packet, as originated by the transmitting SU 14a, including the Tail, the HU 12 disables its Trellis Encoder and broadcasts an additional HU Message to all of its associated SUs 14a–14g. The additional information appended by the HU 12 is twelve symbols long and includes five fields. Those fields are: (a) an indication whether the transmitting station should increase its power prior to its next transmission; (b) an indication whether the transmitting SU's transmission delay should remain as it is or be increased or decreased; (c) an indication whether a reception error was detected by he HU; (d) an indication whether a strong interference is present in the up-link to the HU; and (e) the index of the first slot to be serviced following the end of the transmission.

In the PACKET state all of the SUs 14a–14g, including the transmitting SU 14a, receive the rebroadcast packets from the HU 12, detect the End-Of-Packet Code, check the CRC, decode the HU Message and apply whatever is implied by that message. If it is not a transmitting SU and the CRC is good, the data filed within the packet is transferred to the SU's processors. Upon completion of the HU Message, the HU 12 causes the network to transit back into the IDLE state.

Transmission Format

Discussed above is the communication protocol by which the HU 12 and its associated station units communicate 14a–14b. As was pointed out in the background section, there are a variety of electrical implementations, both baseband and broadband, for such a protocol. A system according to a preferred embodiment utilizes a combination of direct sequence spread spectrum (DSSS) along with differential multiphase shift keying (MPSK) and Trellis Code Modulation (TCM).

DSSS is a form of Code division multiplexing (CDM), developed by the US military in the 1950's to provide reliable and secure voice communications in the field. DSSS involves spreading the power contained in a baseband signal over a broadband in a psuedo-random manner during transmission and retrieving the narrow brand signal during reception. It accomplishes this by individually coding each bit of a digital communication signal. Spread spectrum techniques are well known for their immunity to multipath fading environments, for their resistance to interference and for their natural security features.

In a multipath environment echoes of the transmitted signal are created due to reflections from various objects. These echoes are essentially replicas of the transmitted signal only delayed in time and subjected to an attenuation and a phase rotation. Each path is specified by a particular delay, attenuation and phase shift. All three parameters are independent from each other and vary in a substantially random manner. The signal delay may be expressed in terms of the delay between adjacent paths or the delay span encompassed by significant paths ("delay spread"). In an office environment, adjacent paths are typically separated in time by a few nanoseconds, while a typical delay spread is on the order of a few hundred nanoseconds.

A DSSS receiver, of the type employed in the invention, is synchronized to multiply an incoming spread spectrum signal, having a selected delay, by a despreading code. In this way, the narrow band signal is recovered. Synchronization of the receiver is such that multiplication of incoming signals, having delays other than the selected one, yields substantially insignificant results as compared to multiplication involving the signal having the selected delay. Therefore, DSSS acts to reject almost completely, all the channel delays which do not match the selected delay. By repeating the despreading process for several channel delays, the receiver combines signals arriving at a plurality of different time delays. A receiver which combines a number of differently delayed signals is known as a RAKE receiver.

Figure 5:
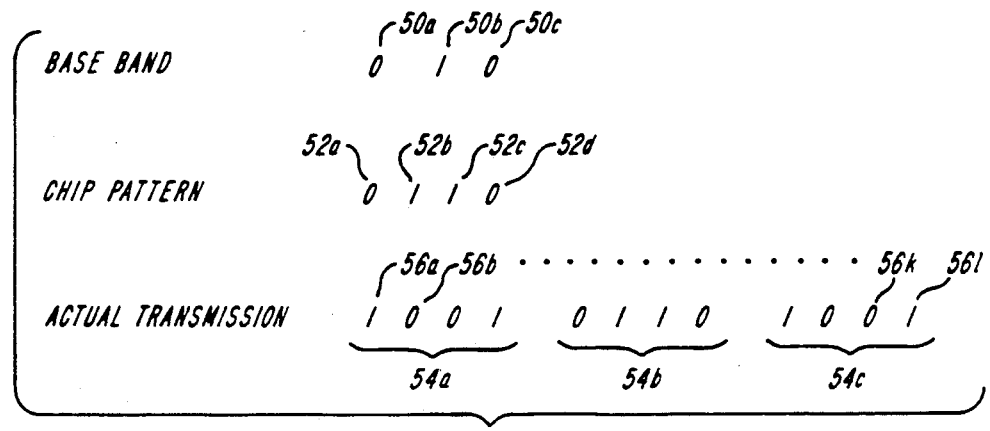
FIG. 5 illustrates spread spectrum encoding.

FIG. 5 depicts a simplified example of DSSS. As can be seen, the baseband message bits 50a-50c are multiplied by digital chip pattern 52a-52d. This results in each message bit being spread into a four bit code 54a-54c of sub-bits 56a-56r called chips. Spread spectrum code 54a corresponds to baseband data bit 50a. Likewise, code 54b and 54c correspond to data bits 50b and 50c respectively. In that example the signal 54 has a bandwidth which is four times the bandwith of the original message signal 50. Additionally, the power contained in the original signal 50 is spread over the extended bandwidth of the spread spectrum signal 54. Typically, the chip pattern 52 is a relatively long psuedo-random code. Therefore, a receiver which does not possess the psuedo-random code will not be able to coherently combine the signal power contained in each chip 56a-56r to reconstruct the original message bits 50a-50c.

As is well known in the art, MPSK involves representing binary codes by incremental shifts in the phase of a carrier signal. In one preferred embodiment, sixteen phases (0-337.5 degrees in 22.5 degree steps) are utilized to represent all possible combinations of a four bit binary code. The utilization of multiphase shifting improves the throughput of the system over a standard dual PSK system. Since it is easier for a receiver to detect the presence or absence of a change of phase than it is to determine the phase itself, a differential implementation is utilized.

DPSK fits well into the indoor multipath environment. The reason for this is that the dynamics of an indoor multipath channel is such that changes in response are relatively slow and may be regarded as practically zero, from one transmitted symbol to the next. Consequently, DPSK, which is based on the difference in phase between adjacent symbols is not affected by channel variations.

DPSK is also a natural match with the RAKE processing. If K delays are processed, each of them has an independent phase and amplitude. However, the differential phase of each signal, nevertheless, is representative of the transmitted phase. The differential phase is generated by complex multiplication of the current symbol phase by the conjugate of the previous symbol phase. According to the invention, a weighted average of the differential phase vectors of each of the K delayed signals is taken to determine a resultant vector having a particular phase. Each signal is weighted by the product of the amplitudes of its two adjacent delayed signals. Through this averaging process, the signal to noise ratio is improved.

The invention also employs Trellis Modulation Encoding. Trellis encoding is well known in the art. It has the advantage of having minimal affects on the original data bandwidth while achieving a reasonable coding gain. The coding gain is the improvement in the signal to noise ratio. The coding gain achieved in an embodiment of the present invention is approximately 3dB by utilizing a four state Trellis code.

Hardware Description

The primary components of the invention are the Hub Unit (HU) and the Subscriber Units (SUs). As previously discussed with respect to FIG. 2, the SU may be further comprised of data terminal, a wireless transceiver and a network interface. As depicted in FIG. 3, the data terminal may be any computer or computer related device. Moreover, an SU may include a single data terminal or an entire network, interfaced to the HU through one or more wireless tranceivers. The network interfaces typically mount internal to the data terminal and are the wired communication interface over which information is transferred between the wireless transceiver and the data terminal.

Wireless tranceivers are included in both SUs and HUs and are essentially the interpreter between either an SU or an HU and the network. In the case of transmissions, the wireless transceiver receives information from the SU over the network interface, according to the particular protocol the SU is operating under, such as IEEE 802.3 or IEEE 802.5. The wireless transceiver then reformats the information according to the wireless network protocol, and transmits it over network. In the case of SU receptions, the wireless transceiver receives the transmission over the network, reformats it according to the SUs particular protocol and transmits the information, via the network interface, to the particular SU. In the case of HU reception, reformatting may only be necessary if the HU is also in wired communications with another network as depicted in FIG. 3.

Employing a down-link 16 according to the embodiments of FIGS. 1 and 3 requires the following synchronization processes: (1) spreading sequence acquisition; (2) spreading sequence delay tracking; (3) carrier frequency synchronization or compensation.

The goal of sequence delay acquisition is to locate the RAKE "window" (the range of continuous sequence delays to be processed) in such a way that the power of the channel paths falling within this window is maximized. According to the invention, different delays are scanned by a moving digital correlator. At a given time interval an acquisition module compares the power measured in the current RAKE window with the power measured within an alternative window. The power of the alternative window is measured by the moving correlator, while the current window's power is measured by the K correlators used for the RAKE demodulation. The search for the better window is of the type "double dwell" where, in the first dwell a short comparison is performed the result of which, if indicating a suspected better window, causes the longer second dwell to occur. A measurement of a better window at both dwells causes the RAKE window location to change to that of the alternative one. This type of change may result in a very short burst of symbol errors due to the discontinuity of the respective delays' phases prior to the differential demodulation. Therefore, according to the invention, sequence delay acquisition does not occur during packet reception mode. Instead, it takes place during IDLE mode.

The goal of the delay tracking is to track the transmitter's chip clock as well as changes in the channel response. Local optimization of the RAKE window location occurs as a result. To achieve location optimization, the edges of the current window are examined. The K delays processed by the RAKE demodulator are designated by the indices 0 to $K-1$. The two delays adjacent to the window have the indices $-1$ and K. If the window spanning from $-1$ to $K-2$ has more power than the 0 to $K-1$ window then the window is shifted to the "left". If the 1 to K window contains more power then the window is shifted to the "right". Whether to institute a shift and in which direction is determined by a power comparison of the "right" window with the "left window." If the power comparison applied at a relatively high rate (relative to the channel time constant which is on the order of 10ms), it results in an average window location which is close to the locally optimal one. Any chip clock frequency offset between transmitter and receiver will generate a phase drift which is tracked by applying the power comparison algorithm, assuming the frequency offset is small, as it is when considering practical values. If for some reason, the multipath Profile (its response described in time domain as reflected to the receiver) changes locally this mechanism is also able to track it. Drastic changes are detected and adjusted for by the sequence delay acquisition mechanism.

Two modes can be defined for the tracking process, "digital" and "analog." In the digital mode, the receiver's chip clock is just a local, crystal derived clock which does not track the received signal. The tracking is performed by applying the "right" and "left" energy comparisons previously discussed and simply jumping the window location by one chip according to that comparison. The "right" and "left" energies are measured over many symbols. However, an inherent location jitter of $+1$ chip occurs as a result of this technique.

According to the analog technique, the "right" and "left" energies are accumulated over a much shorter period, and their comparison is not applied directly to the window location. Instead, it is used to drive a type of a Phase Lock Loop (PLL) called a Delay Lock Loop (DLL). Basically, the right/left comparison plays the role of the phase detector, while the loop filter and VCO are as in a standard PLL. The PLL bandwith is sufficiently narrow to effectively filter out the jitter and results in the average location window being very close to the locally optimal one.

A drawback of the analog mode is its inability to acquire and lock on the incoming chip rate if significantly different from the VCO initial frequency. The problem stems from the SUs using the same chip clock for both its up-link transmitter and its down-link receiver. This is done because the HU uses the same clock for both up-link and down-link, hence when the SU receiver synchronizes itself to the HU clock, its transmitter is automatically synchronized to the appropriate clock. A voltage controlled crystal oscillator (VCXO), being inherently more stable, solves this problem. However, the use of a VCXO is much more expensive than a simple VCO.

Regardless of the mode of window adjustment, the impact of a window shift in the receiver is minimized by executing the shift on a symbol boundary (transition between adjacent symbols). By swapping the correlator's indices between the symbols the differential vector generation is still correct at that transition. The effect of that shift executed during packet transmission will be an error in the Hub's receiver which is not aware of that change and cannot adjust itself. Disabling that shift during transmission is possible, however it is conditioned on the requirement that the offset between the HU and the SU chip clocks is small enough such that during the longest allowed packet, the drift between them should be maintained below some level (one chip is a reasonable threshold).

According to this invention, a mix of the digital and analog modes is utilized. During the initialization stage, defined as the period before receiving packets or other expected transmission, the digital mode is used. Later, after the acquisition and tracking have been proved to be valid by the detection of correct transmissions, a switch to the analog mode occurs.

During this initialization stage a transmission, under this invention, is not allowed (the up-link based on the validation of the down-link), therefore the problem of window location shifts does not exist. The SU receive clock is generated by a PLL consisting of a VCO (not VCXO). a divider by N, a phase-frequency detector, loop-filter and a crystal oscillator at the frequency chip rate/N. This is a standard PLL locked on a relatively cheap low-frequency oscillator and capable, due to the phase-frequency detector, to acquire the approximate chip rate frequency even though the VCO initial frequency may offset. Once acquisition has been achieved, the digital tracking mechanism starts adjusting the window location to achieve, within one chip, the locally optimal location and to digitally track phase drift due to frequency offset.

In switching to the analog mode the right/left comparison stops being averaged and applied to the digital window location. Instead the comparison outcome starts being applied as the replacement of the phase-frequency detector in the PLL configuration. This instantaneous switch enable the DLL to start operating with a VCO at almost the correct frequency and therefore, no frequency acquisition is required and the DLL can function properly as long as there is a signal to track. Thus, the need for an expensive VCXO is eliminated.

The object of carrier frequency synchronization is to compensate for any carrier frequency offset between the transmitter and the receiver. This is a typical problem in a system according to the present invention wherein a large number of phases M are employed, the carrier frequency is very high and not very expensive crystals are used, and the symbol period is not very short. The requirement is basically that the differential phase error due to frequency offset which is $2o(\Delta f \cdot T_{sym})$ where $\Delta f$ is the frequency offset and $T_{sym}$ is the symbol period, must be much smaller than the transmitted phase resolution $2o/M$. This requirement may not meet under worst case conditions, there the invention provides for compensation.

According to the invention, the average post-demodulation differential phase error is estimated. This differential phase error, if averaged long enough, becomes very close (theoretically equal) to $2\pi(\Delta f \cdot T_{sym})$ and can be subtracted from the demodulated differential phases to obtain the actual output differential phase of the demodulator. The frequency offset changes mainly with temperature and aging and is a very slow process. Therefore, very long averaging of the phase error can be accomplished to achieve a high accuracy.

A feature of the invention is that the Hub conveys its control symbols, which determine the state of the protocol, by using the differential phases of 180° and 0° as logical '1' and '0', while no other phase is used unless it is during a packet. In addition, a minimum number of such symbols is guaranteed between packets. A station synchronized on the protocol knows to anticipate when these characters should be received. The phase averager utilizes these known characters to perform its error correcting averaging.

Figure 6:
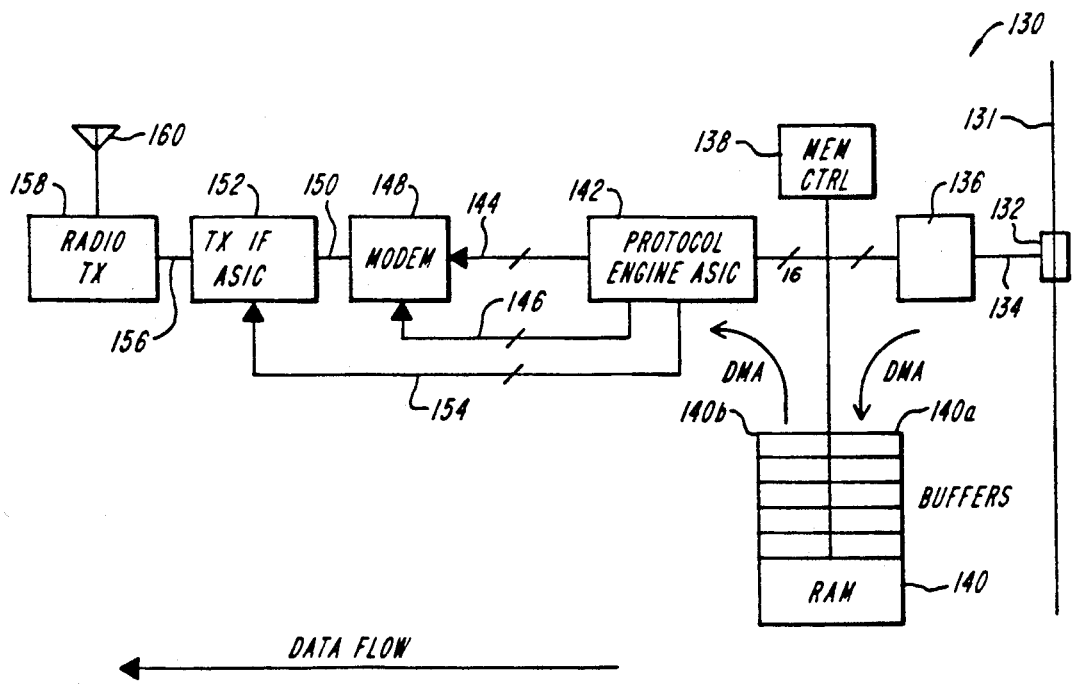
FIG. 6 depicts a block diagram of a Transmitter section of a Wireless Transceiver according to the invention.

FIG. 6 depicts a block diagram of the transmitter section 130 of a wireless transceiver according to the invention. Wired communication bus 131 may be an internal communication bus, as in the case where the SU comprises a single data terminal or where the wireless transceiver is operating in an HU. Alternatively, it may be a hardwired network bus, as in the case where the SU is a complete network. Transmitter 130 is in communication with bus 131 via wired interconnection 134 and network interface 132. Digital communications, intended for wireless transmission are passed via interconnection 134 to interface controller 136. The Interface Controller 136 stores those digital signals in ram buffer 140. The transmitter protocol engine 142 receives the digital signals from ram buffer 140 and controls reformatting those signals according to the protocol requirements of the wireless network. According to the invention, interface 136 may access ram 140, via I/O port 140b, at a different data rate than the protocol engine 142 accesses ram 140 via I/O port 140a. Dual port memory controller 138 controls this process.

The protocol engine 142 performs several formatting functions. One formatting function it performs is to encode the differential multiphase modulation information. It accomplishes this by encoding sixteen possible phases as four binary bits. Additionally, the protocol engine utilizes a forty-eight bit spread spectrum chip sequence to further encode the digital signals. The protocol engine 142 then passes the encoded digital signals to the modem 148, via transmission path 144. Protocol engine 142 also provides modem 148 with various control and timing signals 146. The modem 148 does _____ and then passes the digital data to the Intermediate Frequency (IF) module 152 via transmission path 150. The IF module 152 latches the digital signals passed from the modem 148 and then performs an analog to digital conversion on those signals. The IF module 152 then modulates the analog baseband signal onto a transmitter IF carrier at 360 MHz, according to control signals 154 provided from the protocol engine 142. The modulated signal is then passed to radio transmitter upconverter module 158, via transmission path 156. At transmitter module 158 the information signal is further modulated up to a 2.440 GHz carrier frequency in the case of an SU transmisson and a 5.780 GHz carrier frequency in the case of an HU transmission and transmitted over the wireless network via antenna 160.

Figure 7:
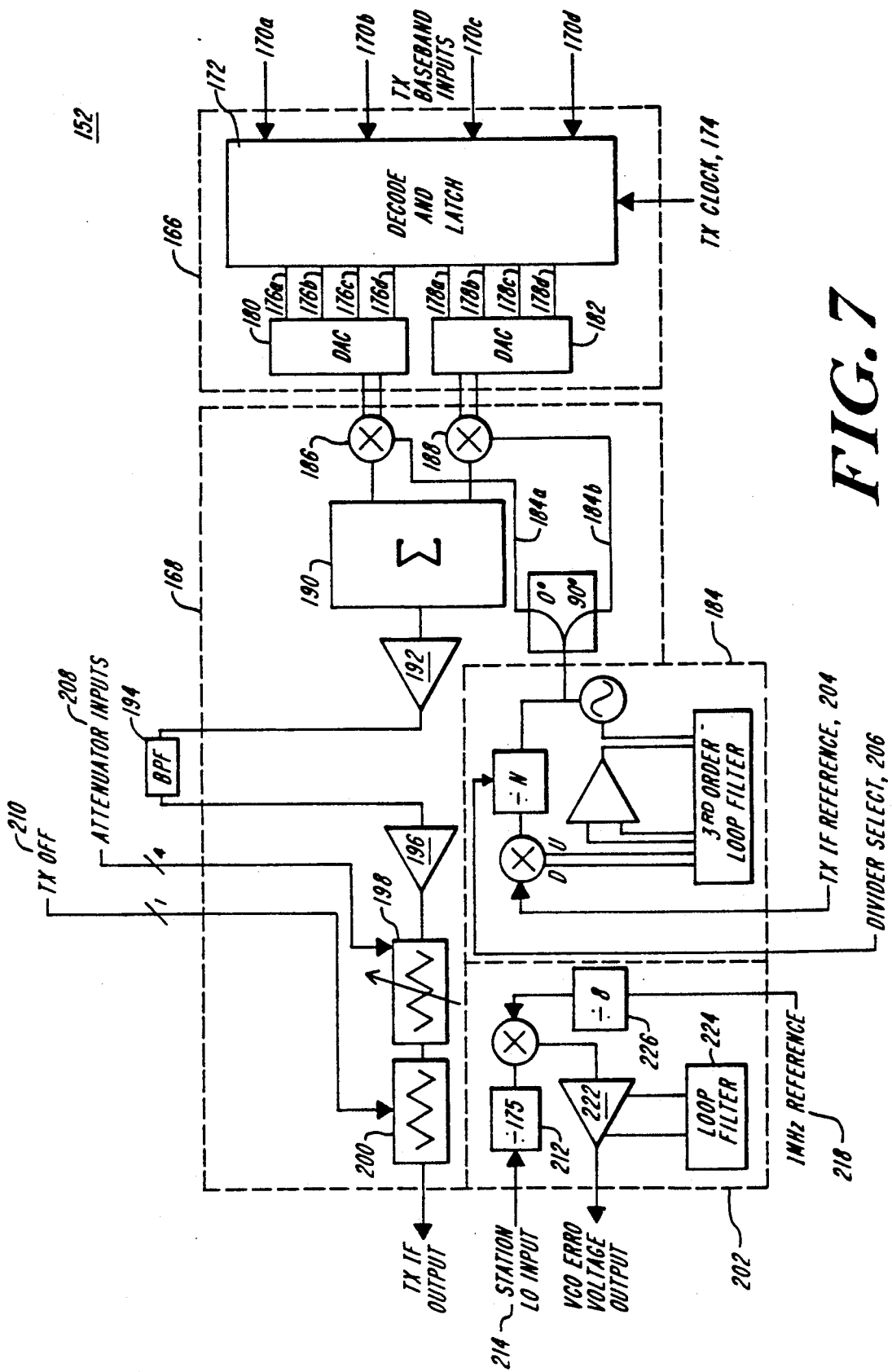
FIG. 7 is a detailed block diagram of baseband and IF modules of FIG. 6.

FIG. 7 provides a more detailed block diagram of the IF module 152. As can be seen from FIG. 7, the IF module 152 may be divided into a baseband section 166 and an IF section 168. The baseband portion 166 is comprised of the input data latch and decoder 172, and the dual digital to analog converters 180 and 182. The elements of the IF part 168 are the quadrature output, phase-locked local oscillator 184, the in-phase and quadrature mixers 186 and 188 respectively, the summer 190, the amplifier 192, external filter chain 194, the filter buffer amplifier 196, the programmable gain control 198, the output switch 200, and divider circuitry 202.

This module processes the digital signals 170a–170d containing the spread spectrum and phase modulation encoding which is passed on by the protocol engine. The input data is first latched by the input data latch and decoder 172 to synchronize it with the transmitter clock 174 and to eliminate potential data jitter. The four bits 170a–170d, representing each of the possible sixteen phases needed, are then decoded into two digital words 176a–176d and 178a–178d. Digital words 176 and 178 are then converted into analog signals at analog to digital converters 180 and 182 respectively. The two analog signals are then passed to the dual quadrature fed mixer modules 186 and 188. Mixers 186 and 188 modulate the baseband data signals onto the transmitter IF carrier at 360 MHz. Mixers 186 and 188 are matched to preserve the output phase accuracy. The matched outputs of the mixers 186 and 188 are then summed in phase in summer 190. The output of summer 190 is then buffered through driver amplifier 192 and filtered through band pass filter 194. The output from bandpass filter 194 is also buffered through amplifier 196 to buffer the impedance of filter 194.

The quadrature mixers 186 and 188 are fed from a local oscillator 184 at 360 MHz whose output is split into two signals 184a and 184b that are separated in phase by 90 degrees. The oscillator 184 is phase-locked to an external reference signal 204 at either 5.625 MHz or 1.0 MHz depending on whether the wireless transceiver is being used for a SU or a HU. Likewise, the divider ratio is also selectable at either 64 or 360 by control signal 206.

The next stage in the transmitter IF module 152 is a programmable gain stage 198, controlled by a four bit binary control signal 208. This stage provides a monotonic attenuation range of 0–75 dB in 5 dB increments. The minimum value of the maximum attenuation should be 40 dB.

The final stage in the primary signal path in module 152 is the on/off switch 200. When the SU is not transmitting, switch 200 provides a mechanism by which transmitter 130 may be turned off. Switch 200 has a minimum off state isolation of 30 dB and an off to on delay of less than 100 ns and is controlled by digital input 210.

The IF module 152 also contains a divider 202. Divider 202 is used in phase-locked loops for external microwave circuits. It consists of a divider 212 which divides a 21.875 MHz input signal 214 by 175, a phase-frequency detector 216 which is fed with an external reference signal 218 at 1 MHz which is internally divided by eight in divider 220, and a loop amplifier 222 that has external elements 224 which determine the loop parameters.

Figure 8:
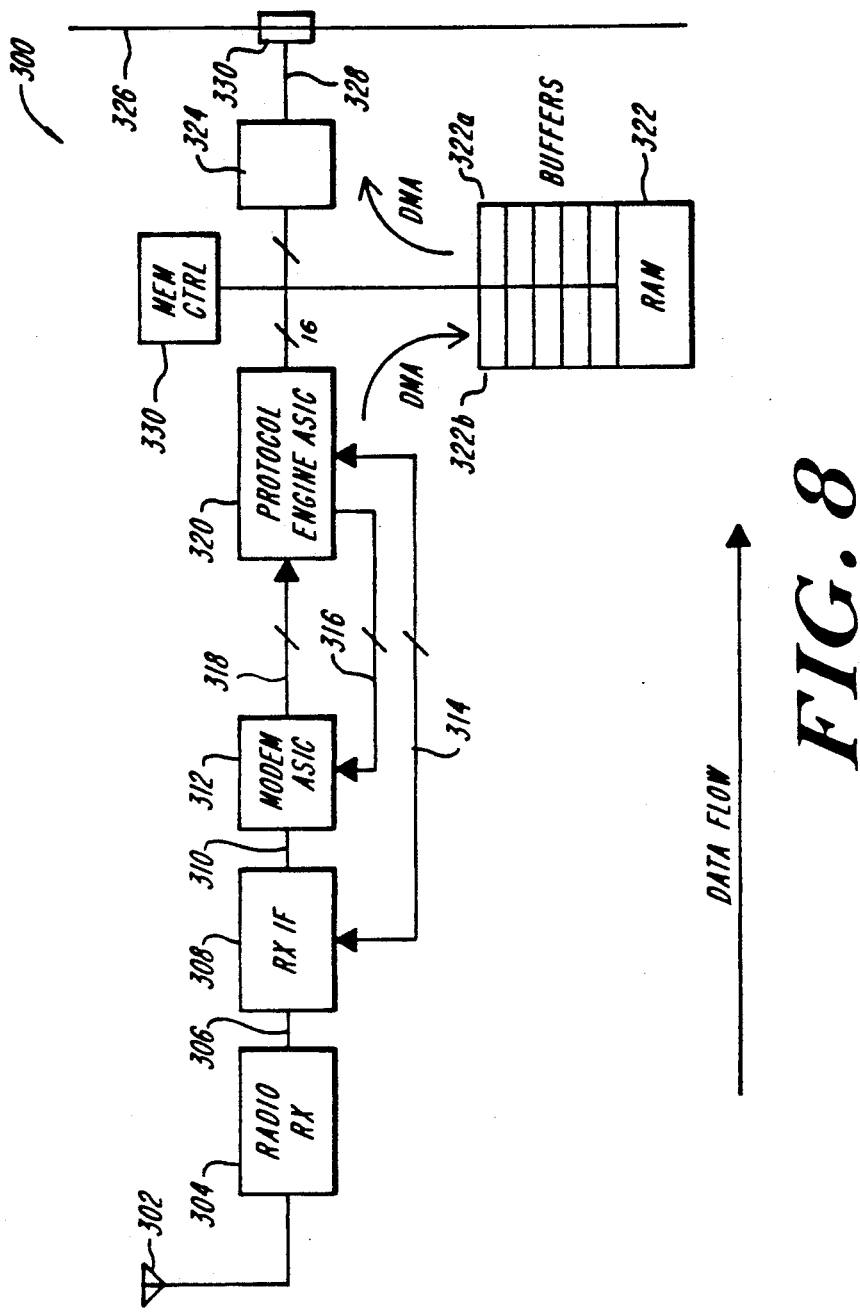
FIG. 8 depicts a block diagram of the Receiver section of a Wireless Transceiver according to the invention.

FIG. 8 is a block diagram of the receiver portion 300 of a wireless transceiver according to the invention. The incomming communication signal is received at antenna 302. Where the transmission is being received by a SU, the received signal is at a frequency of 2.440 GHz. However, if the signal is being received at a HU, the received signal is at a frequency of 5.780 GHz. The signal is immediately passed to Radio Receiver Down Converter 304 which demodulates the signal down to an intermediate frequency of 180 MHz. Down Converter 304 passes the converted signal to Receiver IF Module 308 via transmission path 306. The IF Module 308 then, further demodulates the received signal and converts it to a baseband digital representation. The IF Module 308 performs its functions according to control signals 314 provided by the Protocol Engine 320. The converted baseband digital signals are transmitted from the IF Module 308 to the Modem 312. The Modem 312 passes the digital signals on to the Protocol Engine 320 via transmission path 318. The Protocol Engine 320 strips out the multiphase modulation information and the spread spectrum encoding, formats the information according to the requirements of the particular SU or HU and stores the baseband digital information in the ram buffer 322 via port 322b. The Interface Controller 324 reads the formatted information from the RAM buffer 322 via port 322a and passes it to the wired bus 326 via the wired interconnection 328 and the network interface 330. The wired bus 326 may be an internal data bus as in the case where the SU is comprised of a single data terminal or where the information is being received at an HU. Alternatively, it may be a hardwired network, as in the case where the SU is comprised of an entire network. The Protocol Engine 320 and the Interface Controller 324 may access the ram buffer 322 at two different data rates. Memory Controller 330 coordinates this memory access.

Figure 9:
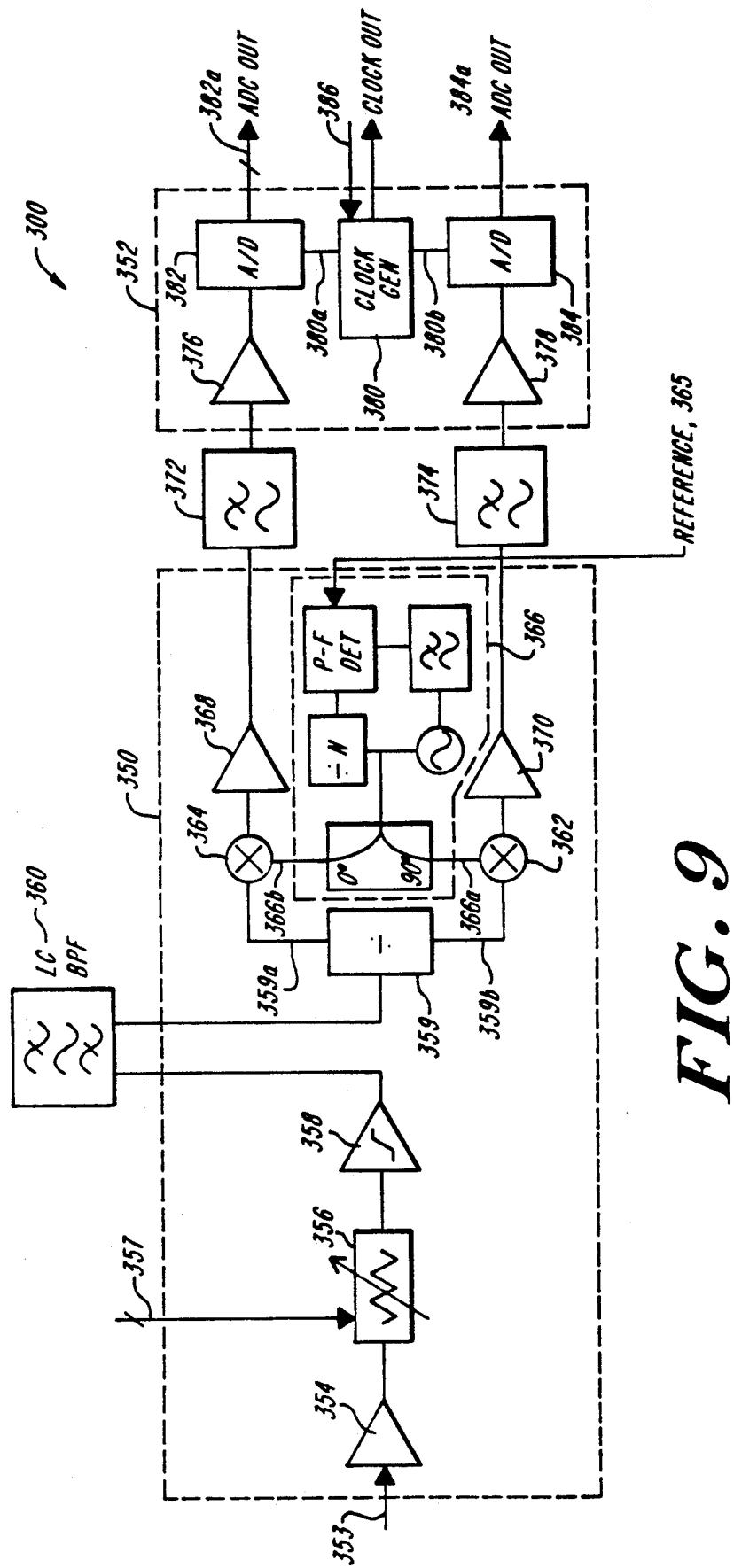
FIG. 9 is a more detailed block diagram of the baseband and IF modules of FIG. 8.

FIG. 9 is a more detailed block diagram of the Receiver IF Module 300 of FIG. 8. The purpose of the Receiver IF Module 300 is to condition the input phase modulated signal and to convert this signal from a polar, IF representation to a Cartesian, baseband digital representation. The resulting digital signals are then passed to the Modem 312 for further processing.

There are two functional subdivisions to this module, an IF part 350 and a baseband part 352. The elements of the IF part are an input amplifier 354, a programmable gain control 356, a limiting amplifier 358, a bandpass filter 360, an I-Q down converter mixer set 362 and 364 and a quadrature output phase-locked local oscillator 366. The elements of the baseband part 352 are video buffer amplifiers 368 and 370, low-pass filters 372 and 374, video driver amplifiers 376 and 378, a clock generation module 380 and analog to digital converters 382 and 384.

The IF Module 300 receives, as its input 353, a spread spectrum, differentially encoded phase modulated signal centered at 180 MHz with an effective noise bandwidth of approximately 70 MHz. The input signal to the module 352 ranges from −63 dBm to approximately −7 dBm. The signal is amplified in a low-noise input amplifier 354 and then the signal level is set by a programmable gain stage 356. The programmable gain stage 356 is controlled by inputs 357 from the Protocol Engine 320 depicted in FIG. 8. The programmable gain stage 356 acts to compensate for unit-to-unit and temperature variations in gain in both this module and the preceding stages. The approximate range of the gain control is about 16 dB. Approximately 8 dB is allocated for prior stages and 8 dB is allocated for module 352.

The signal is then passed to a limiting amplifier 358 to remove any amplitude modulation present to improve the systems dynamic range. It also limits the magnitude of the baseband signals applied to the inputs of the analog to digital converters 380 and 382. After the limiter the signal is further filtered through bandpass filter 360 and then passed to the mixer module divider 359.

At the divider 359, the signal is split into an in-phase channel 359a and a quadrature channel 359b for mixing down to baseband. The mixers 362 and 364 are driven by a local oscillator 366 whose outputs 366a and 366b are 90 degrees offset from one another. The local oscillator is a VCO at the IF frequency and is phase-locked to an external, 1 MHz reference signal 365 derived from a crystal oscillator at 16 MHz.

Following conversion to baseband, the in-phase and quadrature signals are passed to video amplifiers 372 and 374 respectively. Amplifiers 372 and 374 server to buffer the mixers 364 and 362 from the impedances of the filters 372 and 374 and to provide sufficient signal drive into those filters. Once passed through lowpass filters 372 and 374, the signals are buffered through amplifiers 376 and 378 and then fed into analog to digital converters 382 and 384. Analog to digital converters 382 and 384 sample the baseband signals according to clock signals 380a and 380b generated by clocking circuit 380 and convert them to digital data. The sampling frequency of the analog to digital converters 382 and 384 is controlled by input 386 to clock circuit 380. The digital signals 382a and 382b are then passed to the modem 312 of FIG. 8 for further processing.

As was previously discussed, one embodiment of the invention typically operates in an office environment. In such an environment, there are many objects such as walls, file cabinets and desks which may act to deflect transmitted signals. This deflection may result in creating multiple signal paths by which a given transmission reaches its destination. Such a multiple path channel is characterized by each path having a different time delay, amplitude and phase. Since the different paths may have random independent phases, the received combined amplitude could vary by considerable amount and may sometimes be below the required minimum signal level. As also noted above, a direct sequence spread spectrum (DSSS) approach improves on the multipath problem combining the signals received from the different signal paths.

System Initialization

During system initialization the HU performs various functions. These functions are divided into two categories: HU initialization and SU initialization. The SU initialization functions include allowing SUs to establish membership in the network, and setting SU to HU transmission signal power level and time delay parameters. The HU initialization includes selecting the spread spectrum code to be used, setting the HU receiver gain, and setting the HU to SU transmission signal power level. These initialization functions are described below.

A particular SU is considered a member of the wireless network when its associated wireless terminal possesses the correct network spread spectrum-code and has been assigned a free time slot number. Only when the wireless terminal has both of those parameters may its associated SU communicate with the HU. If it has both of these parameters and it wishes to become active on the network then it sends a message, during its allocated time slot, to the HU that it is active. The HU then acknowledges activation on the network through transmission of an identification supervisory packet (ISP). An ISP typically consists of five fields: configuration serial number, spread spectrum code set number, number of configured SUs, number of active SUs and a list of identification addresses of all configured stations.

In a preferred embodiment, any one of a plurality of network spread spectrum codes may be utilized with respect to a particular HU. Additionally, different HUs will employ different network codes to minimize inter-network interference. Each wireless terminal has the potential network codes stored in an internal ROM, along with the network configuration serial number so it can identify the correct HU. If the wireless terminal does not know which of the possible codes to use, then it shifts into IDLE NO TX state and monitors HU transmissions over the down-link channel until it determines that code. Once the transceiver, wishing to join the network, ascertains what it believes to be the proper spread spectrum code, it transmits a request to join the network during slot 0. The request to join includes an identifying address. When the HU receives a request to join the network, it first looks for the identifying address in its members list. If the SU appears on its list, the HU returns a message that assigns the SU a slot number. If not, it rejects the request. The member list prevents SUs from one network accidentally joining another network.

If the SU attempting to join the network is denied access by the HU, or if it is responded to by the wrong HU, it may repeat its request to join, utilizing the other spread spectrum codes in its wireless terminals. If after a predefined number of attempts, it is still unable to join the network, it then executes an SOS sequence. The SU is not synchronized with the HU during an SOS transmission. Therefore, a relatively long transmission is utilized which enhances the chances of HU reception, despite collisions and lack of synchronization. If the SU receives an ISP from the correct HU, then it joins the network. Otherwise, after a defined number of SOS attempts, it becomes inactive.

Because SUs may be at varying distances from their HU, SU to HU transmission signal delays may differ for each SU. Additionally, the required transmission power at each SU, which ensures reliable HU reception may also differ. Therefore, once communication is established, the transmission power level and time delay is fine tuned. The particular SU being initialized transmits Transmitter Test Packets (TTPs) to its HU, at a plurality of power-delay combinations. The HU selects the best power as the lowest level which has a signal quality exceeding a defined threshold, or if none exceeds the threshold, then the highest quality power level. The best delay is selected as the one which provides the best timing results, with respect to the predefined time frame, at the selected power level. Both power level and transmission signal delay may be dynamically modified subsequent to a SU joining the network.

The criteria for selecting the particular spread spectrum code to be used and for setting the gain control for the HU receiver is that combination which results in minimum noise in the received signal. The HU determines the proper combination by monitoring the up-link channel from its associated SUs and tracking the rate of falsely detected transmission requests with respect to each potential gain and code combination. If the HU changes the particular spread spectrum code being used over the network it must inform all SUs by transmitting an ISP.

The HU to SU transmission power is adjusted based on SU reception statistics. For example if the stations are receiving a number of erroneous transmissions from the HU then the power level at the HU is increased. The HU transmitter power is also adjusted based on signal quality index measurements taken at each SU. These, like those taken at the HU during the SU power adjustment, involve comparing the received signal to an acceptable threshold level.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A multiple access communications system, comprising
   A. one or more hub units,
   B. a plurality of station units associated with each of said hub units,
   C. link means for establishing a bidirectional communications link between each of said hub units and its associated station units, said link means including:
      i) downlink means for establishing a unidirectional downlink radio frequency signal path from each of said hub units to all of its associated station units at a first predetermined frequency,
      ii) uplink means for establishing a unidirectional uplink radio frequency signal path from each of said station units to its associated hub unit at a second predetermined frequency,
      iii) synchronization means, selectively operative in a first mode, for establishing a common slotted time frame for each of said hub units and its associated station units, said time frame defining a plurality of time slots, and for allocating subsets of said time slots to each of said associated station units, and selectively operative in a second mode, for allocating sole access to said uplink radio frequency signal path to one of said associated station units, in response to receipt of an access request signal from said one station unit in a time slot included in said subset of time slots allocated to said one station unit,
   verification means for verifying, within a predetermined number of said time slots the integrity of said bidirectional communications link between each of said hub units and its associated station units, wherein said predetermined number is less than the total number of slots in said time frame.

2. A system according to claim 1 wherein said link means further includes:
   uplink transmit means at each of said station units, said uplink transmit means being operative in said station unit's subset of time slots of said time frame for selectively transmitting station unit signals over said uplink radio frequency signal path to said hub unit associated with said station unit,
   HU receive means at each of said hub units for receiving said station unit signals from its associated station units via said uplink radio frequency signal path,
   downlink transmit means at each of said hub units, said downlink transmit means being operative in response to said received station unit signals from each of its associated station units for transmitting hub unit signals corresponding to said received station unit signals over said downlink radio frequency signal path to each of its associated station units, SU receive means at each of said station units for receiving said hub unit signals from its associated hub unit via said downlink radio frequency signal path, verification means at each of said station units for comparing said transmitted station unit signals and corresponding received station unit signals, and error means responsive to said comparison for generating an error signal when said transmitted station unit signals and said corresponding received station unit signals fail to be characterized by a predetermined correlation.

3. A system according to claim 1 wherein said link means further comprises

SU uplink conversion means at each of said station units for converting, from a baseband digital format to a direct sequence spread spectrum format, said station unit signals to be transmitted, HU uplink conversion means at each of said hub units for converting, from a direct sequence spread spectrum format to a baseband digital format, said received station unit signals, HU downlink conversion means at each of said HU's for converting, from a baseband digital format to a direct sequence spread spectrum format, said hub unit signals to be transmitted from said hub units to said associated station units, SU downlink conversion means at each of said station units for converting, from direct sequence spread spectrum format to a baseband digtal format, said received hub unit signals.

4. A system according to claim 3 wherein said SU uplink conversion means further includes means for converting, from a baseband format to a phase modulated format, said transmitted station unit signals, said HU uplink conversion means further includes means for converting, from a phase modulated format to a baseband format, said received station unit signals, said HU downlink conversion means further includes means for converting, from a baseband format to a phase modulated format, said transmitted HU signals, and said SU downlink conversation means further includes means for converting, form a phase modulated format to a baseband format, said received HU signals.

5. A system according to claim 1 wherein said link means further includes uplink availability detector at each of said station units, said uplink availability detector including:

means for monitoring said downlink radio frequency signal path from its associated hub unit and LBT means responsive to said monitoring means for determining availability of said uplink radio frequency signal path prior to transmitting a signal from said station unit to its associated hub unit via said uplink radio frequency signal path.

6. A system according to claim 5 wherein said LBT means includes means for identifying periods when such periods being indicative of permitted transmission by said station unit.

7. A system according to claim 1 wherein said link means further includes uplink unavailability detector at each of said station units, said uplink unavailability detector including:

means for monitoring said downlink radio frequency signal path from said hub unit during transmission of said station unit signals by said station unit to its associated hub unit over said uplink radio frequency signal path and LWT means for detecting if the hub unit becomes unavailable to said station unit during said transmission.

8. A system according to claim 7 wherein said LWT means includes means for identifying, 9. A system according to claim 1 further including station unit transmission signal power adjustment means for adaptively controlling transmission signal power for at least one of said station units whereby said transmission signal power level from said station unit is substantially at a predetermined level at its associated hub unit.

10. A system according to claim 9 wherein the transmission signal power levels of said station units at their associated hub unit are controlled to be substantially equal.

11. A system according to claim 1 further including hub unit transmission signal power adjustment means for adaptively controlling transmission signal power at least one of said hub units whereby transmission signal power level from said hub unit is substantially at a predetermined level at a selected one of said station units associated therewith.

12. A system according to claim 11 wherein said selected one of said station units is the station unit farthest away from said hub unit.

13. A system according to claim 1 further including station unit transmission signal delay adjustment means for adaptively controlling transmission signal delay for at least one of said station units whereby transmissions from said station units occur substantially at a predetermined time within said time frame at said hub unit.

14. A system according to claim 1 wherein said link means further includes hub unit retransmission means at said hub units for retransmitting from said hub units to each of said associated station units over said downlink radio signal path, substantially all communications received by said hub unit from each of said associated station units via said uplink radio signal path.

15. A system according to claim 1 further including
a backbone communications bus and
a plurality of network interface units coupled along said bus wherein at least one of said hub units is coupled to and in communications with said bus, said coupling being through an associated network interface unit.

16. A system according to claim 15 wherein said backbone is wireless.

17. A system according to claim 15 wherein said backbone is fiber optically connected.

18. A system according to claim 15 wherein said backbone employs a token passing ring protocol.

19. A system according to claim 15 wherein said backbone employs an ethernet protocol.

20. A system according to claim 15 wherein said backbone is hard wired.

21. A multiple access communications system, comprising
A. one or more hub units
B. a plurality of station units associated with each of said hub units C. link means for establishing a bidirectional communications link between each of said hub units and its associated station units, said link means including
  i) downlink means for establishing a unidirectional downlink radio frequency signal path from each of said hub units to all of its associated station units at a first predetermined frequency,
  ii) uplink means for establishing a unidirectional uplink radio frequency signal path from each of said station units to its associated hub unit at a second predetermined frequency, and
  iii) synchronization means, selectively operative in a first mode, for establishing a common slotted time frame for each of said hub units and its associated station units, said time frame defining a plurality of time slots, and for allocating subsets of said time slots to each of said associated station units, and selectively operative in a second mode, for allocating sole access to said uplink radio frequency signal path to one of said associated station units, in response to receipt of an access request signal from said one station unit in a time slot included in said subset of time slots allocated to said one station unit, 22. A multiple access communications system operating over a predetermined region, comprising:
A. one or more hub units,
B. a plurality of station units associated with each of said hub units,
C. link means for establishing a bidirectional wireless communications link between each of said hub units and its associated station units, said communications link supporting a data rate, R, said link means including:
  i) downlink means for establishing at least one wireless downlink radio frequency signal path for transferring information from each of said hub units to all of its associated station units at a first predetermined frequency, $f_1$,
  ii) uplink means for establishing at least one wireless uplink radio frequency signal path for transferring information from each of said station units to its associated hub unit at a second predetermined frequency, $f_2$,
  wherein $f_1$ and $f_2$ are frequencies at which signal reflections from local objects may exist within said region such that a plurality of said uplink and said downlink radio frequency signal paths may occur between a particular hub unit and an associated station unit,
  each of said signal paths having an associated signal delay for a signal passing over said path, said associated delay varying in proportion to said signal path's deviation in length from that of a theoretical straight line path between said particular hub unit and said associated station unit,
  said signal path having the greatest of said deviations in length being associated with a maximum delay, $D_{max}$, wherein $D_{max}$ is a predetermined portion of $1/R$,
  iii) recovery means, responsive to said signals passing between said particular hub unit and said associated station unit, over said plurality of paths, for regenerating said information transferred between said hub unit and said associated station unit, and
  iv) synchronization means, selectively operative in a first mode, for establishing a common slotted time frame for each of said hub units and its associated station units, said time frame defining a plurality of time slots, and for allocating subsets of said time slots to each of said associated station units, and selectively operative in a second mode, for allocating sole access to said uplink radio frequency signal path to one of said associated station units, in response to receipt of an access request signal from said one station unit in a time slot included in said subset of time slots allocated to said one station unit.

23. A system according to claim 1 wherein said link means further includes controller means for selecting between said first mode and said second mode, and wherein said controller means includes means for transitioning from said first mode to said second mode in response to said hub unit receiving an request signal from one of said associated station units.

24. A system according to claim 1 wherein said subset includes at least one pair of associated time slots in said time frame, and said pair includes a first occurring time slot and a second occurring time slot, wherein each of said station units can request access to said uplink radio frequency signal path during said first occurring time slot and can receive acknowledgement of being granted said access during said second occurring time slot, said first occurring time slot being spaced in time from said second occurring time slot by a period of time equal to or greater than a minimum two-way radio frequency transit time between said hub unit and said associated station unit.

25. A system according to claim 1 wherein each of said subsets include at least one pair of associated time slots in said time frame, each pair including a first occurring time slot and a second occurring time slot, said first occurring time slot being spaced in time from said second occurring time slot by a period of time equal to or greater than a minimum two-way radio frequency transit time between said hub unit and said associated station unit, and wherein
  A. each of said associated station units include
    i) means for transmitting an access request signal to said hub unit over said uplink radio frequency signal path during said first occurring time slot of one of its pairs of associated time slots to request sole access to said uplink radio frequency channel,
    ii) means for receiving, over said downlink radio frequency signal path during said second occurring time slot of said one pair, an allocation signal representative of a grant of sole access to said uplink radio frequency signal path, and
  B. said hub unit includes
    i) means for receiving said access request signal over said uplink radio frequency signal path,
    ii) means for identifying which one of said associated station units originated said access request signal by identifying the one of said pairs of said time slots during which said access request code was received at said hub unit, and
    iii) means for selectively transmitting said allocation signal to said identified station unit over said downlink radio frequency signal path during said second occurring time slot of said identified pair.

26. A system according to claim 25 wherein said link means further includes controller means for selecting between said first mode and said second mode, and wherein said controller means includes means for transitioning from said first mode to said second mode in response to said hub unit receiving said access request signal from said identified station unit.

27. A system according to claim 1 wherein said associated station units include means for transmitting (m) characters to said hub unit over said uplink radio frequency signal path during said second mode of operation, where (m) is an integer less than a predetermined number.

28. A system according to claim 1 wherein said associated station units include means for transmitting (n) packets of information to said hub unit over said uplink radio frequency signal path during said second mode of operation, where (n) is an integer less than a predetermined number.

29. A system according to claim 28 wherein each said packets of information include a selectable number of characters, and said associated station units include means for selecting said number of characters included in each of said packets in response to a control command from said hub unit.

30. A system according to claim 28 wherein said associated station units include means for selecting (n) in response to a control command from said hub unit.

31. A system according to claim 1 wherein said synchronization means further includes means for signaling said associated station units as to which of said allocated subsets of times slots will be a first to occur upon transitioning from said second mode of operation to said first mode operation.

32. A system according to claim 21 wherein said link means further includes controller means for selecting between said first mode and said second mode, and wherein said controller means includes means for transitioning from said first mode to said second mode in response to said hub unit receiving an request signal from one of said associated station units.

33. A system according to claim 21 wherein said subset includes at least one pair of associated time slots in said time frame, and said pair includes a first occurring time slot and a second occurring time slot, wherein each of said station units can request access to said uplink radio frequency signal path during said first occurring time slot and can receive acknowledgement of being granted said access during said second occurring time slot, said first occurring time slot being spaced in time from said second occurring time slot by a period of time equal to or greater than a minimum two-way radio frequency transit time between said hub unit and said associated station unit.

34. A system according to claim 21 wherein each of said subsets include at least one pair of associated time slots in said time frame, each pair including a first occurring time slot and a second occurring time slot, said first occurring time slot being spaced in time from said second occurring time slot by a period of time equal to or greater than a minimum two-way radio frequency transit time between said hub unit and said associated station unit, and wherein A. each of said associated station units include
 i) means for transmitting an access request signal to said hub unit over said uplink radio frequency signal path during said first occurring time slot of one of its pairs of associated time slots to request sole access to said uplink radio frequency channel,
 ii) means for receiving, over said downlink radio frequency signal path during said second occurring time slot of said one pair, an allocation signal representative of a grant of sole access to said uplink radio frequency signal path, and B. said hub unit includes
 i) means for receiving said access request signal over said uplink radio frequency signal path,
 ii) means for identifying which one of said associated station units originated said access request signal by identifying the one of said pairs of said time slots during which said access request code was received at said hub unit, and
 iii) means for selectively transmitting said allocation signal to said identified station unit over said downlink radio frequency signal path during said second occurring time slot of said identified pair.

35. A system according to claim 34 wherein said link means further includes controller means for selecting between said first mode and said second mode, and wherein said controller means includes means for transitioning from said first mode to said second mode in response to said hub unit receiving said access request signal from said identified station unit.

36. A system according to claim 21 wherein said associated station units include means for transmitting (m) characters to said hub unit over said uplink radio frequency signal path during said second mode of operation, where (m) is an integer less than a predetermined number.

37. A system according to claim 21 wherein said associated station units include means for transmitting (n) packets of information to said hub unit over said uplink radio frequency signal path during said second mode of operation, where (n) is an integer less than a predetermined number.

38. A system according to claim 37 wherein each said packets of information include a selectable number of characters, and said associated station units include means for selecting said number of characters included in each of said packets in response to a control command from said hub unit.

39. A system according to claim 37 wherein said associated station units include means for selecting (n) in response to a control command from said hub unit.

40. A system according to claim 21 wherein said synchronization means further includes means for signaling said associated station units as to which of said allocated subsets of times slots will be a first to occur upon transitioning from said second mode of operation to said first mode operation.

41. A system according to claim 22 wherein said link means further includes controller means for selecting between said first mode and said second mode, and wherein said controller means includes means for transitioning from said first mode to said second mode in response to said hub unit receiving an request signal from one of said associated station units.

42. A system according to claim 22 wherein said subset includes at least one pair of associated time slots in said time frame, and said pair includes a first occuring time slot and a second occurring time slot, wherein each of said station units can request access to said uplink radio frequency signal path during said first occurring time slot and can receive acknowledgement of being granted said access during said second occurring time slot, said first occurring time slot being spaced in time from said second occurring time slot by a period of time equal to or greater than a minimum two-way radio frequency transit time between said hub unit and said associated station unit.

43. A system according to claim 22 wherein each of said subsets include at least one pair of associated time slots in said time frame, each pair including a first occurring time slot and a second occurring time slot, said first occurring time slot being spaced in time from said second occurring time slot by a period of time equal to or greater than a minimum two-way radio frequency transit time between said hub unit and said associated station unit, and wherein
  A. each of said associated station units include
   i) means for transmitting an access request signal to said hub unit over said uplink radio frequency signal path during said first occurring time slot of one of its pairs of associated time slots to request sole access to said uplink radio frequency channel,
   ii) means for receiving, over said downlink radio frequency signal path during said second occurring time slot of said one pair, an allocation signal representative of a grant of sole access to said uplink radio frequency signal path, and
  B. said hub unit includes
   i) means for receiving said access request signal over said uplink radio frequency signal path,
   ii) means for identifying which one of said associated station units originated said access request signal by identifying the one of said pairs of said time slots during which said access request code was received at said hub unit, and
   iii) means for selectively transmitting said allocation signal to said identified station unit over said downlink radio frequency signal path during said second occurring time slot of said identified pair 44. A system according to claim 43 wherein said link means further includes controller means for selecting between said first mode and said second mode, and wherein said controller means includes means for transitioning from said first mode to said second mode in response to said hub unit receiving said access request signal from said identified station unit.

45. A system according to claim 22 wherein said associated station units include means for transmitting (m) characters to said hub unit over said uplink radio frequency signal path during said second mode of operation, where (m) is an integer less than a predetermined number.

46. A system according to claim 22 wherein said associated station units include means for transmitting (n) packets of information to said hub unit over said uplink radio frequency signal path during said second mode of operation, where (n) is an integer less than a predetermined number.

47. A system according to claim 46 wherein each said packets of information include a selectable number of characters, and said associated station units include means for selecting said number of characters included in each of said packets in response to a control command from said hub unit.

48. A system according to claim 46 wherein said associated station units include means for selecting (n) in response to a control command from said hub unit.

49. A system according to claim 22 wherein said synchronization means further includes means for signaling said associated station units as to which of said allocated subsets of times slots will be a first to occur upon transitioning from said second mode of operation to said first mode operation.

* * * * *